United States Patent [19]

Trill

[11] Patent Number: 5,228,475
[45] Date of Patent: Jul. 20, 1993

[54] AIR FLOW CONTROL VALVE FOR A HVAC MODULE

[75] Inventor: Thomas A. Trill, Williamsville, N.Y.

[73] Assignee: General Motors Corporation, Detroit, Mich.

[21] Appl. No.: 908,000

[22] Filed: Jul. 2, 1992

[51] Int. Cl.⁵ .............................................. F16K 1/18
[52] U.S. Cl. .................................... 137/875; 251/279
[58] Field of Search .................. 137/872, 875; 251/87, 251/298, 279

[56] References Cited

U.S. PATENT DOCUMENTS

| | | | | |
|---|---|---|---|---|
| 4,402,486 | 9/1983 | Jacquet | ................................ | 251/306 |
| 4,406,214 | 9/1983 | Schurai | ............................ | 137/875 X |
| 4,828,018 | 5/1989 | Hoffman | ................................ | 165/42 |

Primary Examiner—John C. Fox
Attorney, Agent, or Firm—Patrick M. Griffin

[57] ABSTRACT

An air flow control valve assembly for selectively directing air flow through the air chambers of a heating, ventilating and air conditioning (HVAC) module. The assembly includes a support arm rotatably secured at one end to a flat plane valve and defining a first rotation axis therewith, and a second end rotatably secured to the housing of the module and defining a second rotation axis which is parallel and spaced from the first axis. The valve is actuated to move through an arcuate path about the second axis to selectively position the valve in sealing contact with first and second ports for controlling air temperature in a passenger compartment of a vehicle.

4 Claims, 2 Drawing Sheets

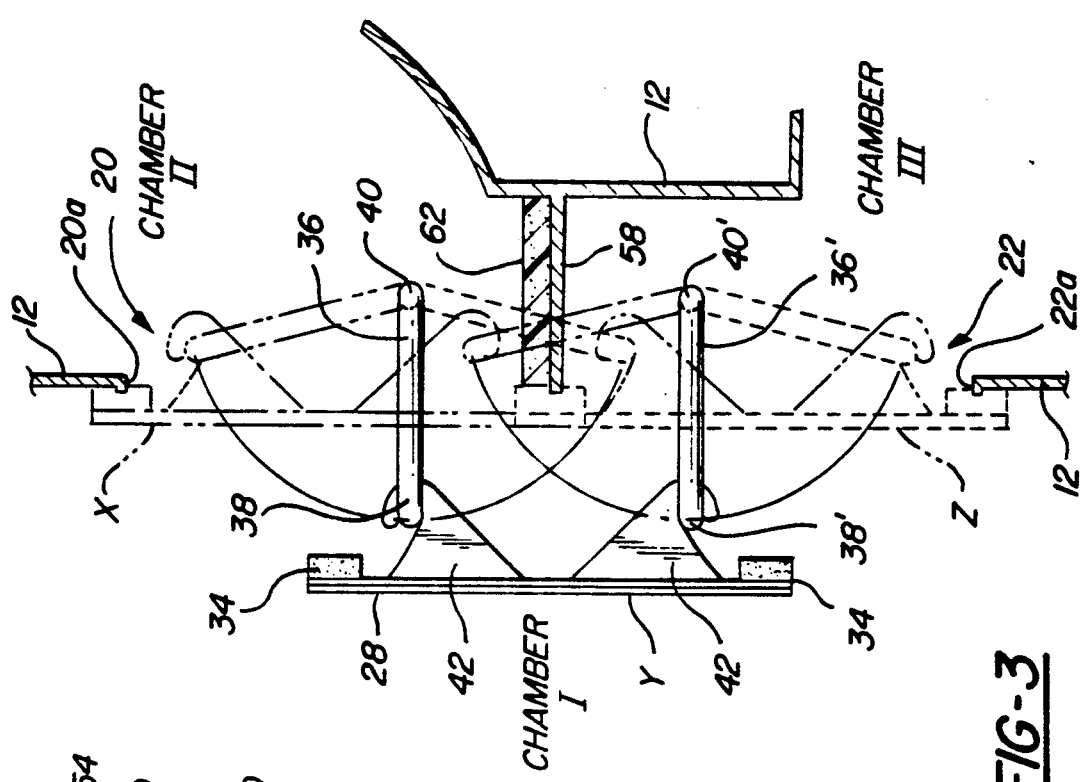
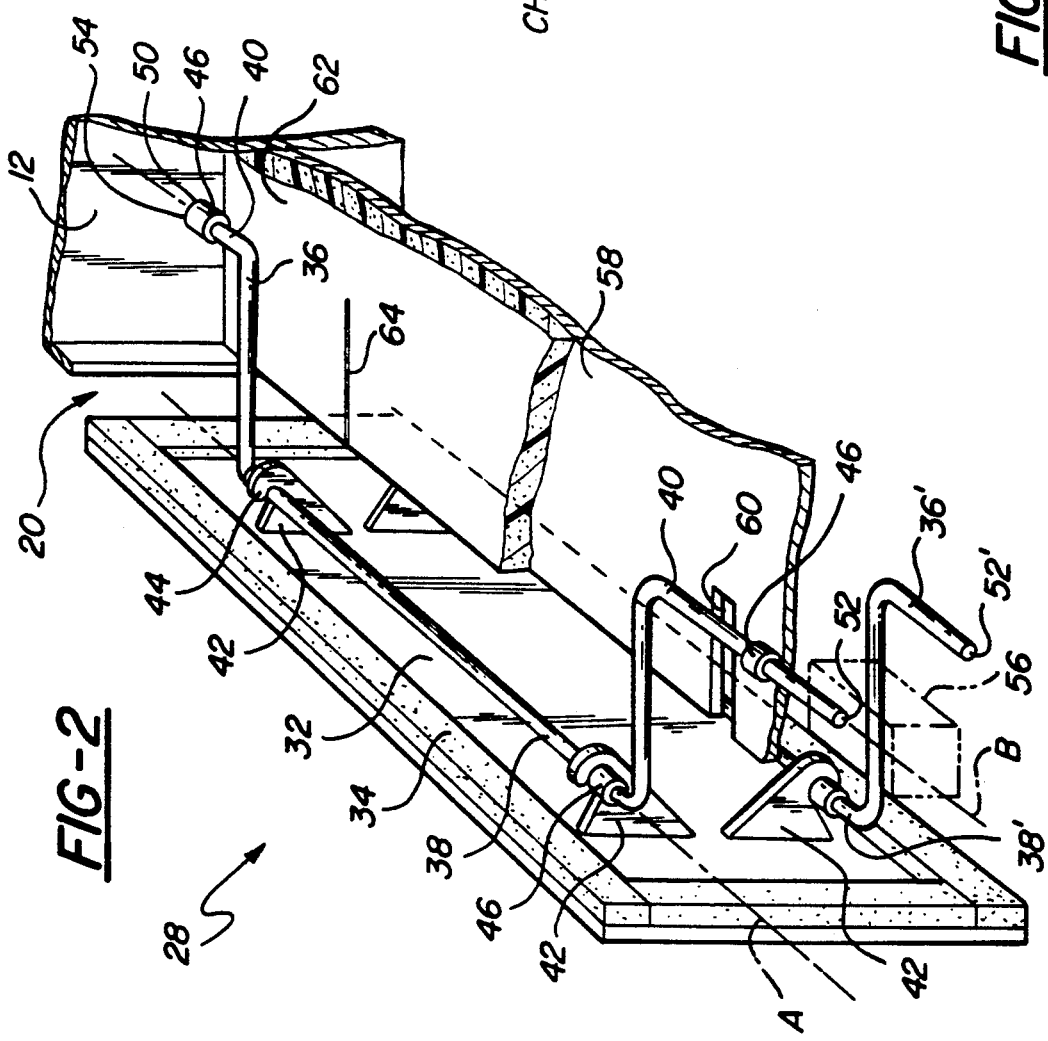

5,228,475

AIR FLOW CONTROL VALVE FOR A HVAC MODULE

BACKGROUND OF THE INVENTION

1. Technical Field

The subject invention generally relates to a flat plane valve used for controlling air flow through air chambers within a HVAC module.

2. Description of the Related Art

Heating, ventilation, and air conditioning (HVAC) modules typically include a plurality of air pathways therethrough which direct air flow through heat exchangers (to heat or cool the air) and to various vents (e.g. to the floorboard or dashboard). Air flow valves are positioned throughout the HVAC modules adjacent such pathways in order to selectively direct the air flow through the desired pathway in order to control the temperature and direction of the air flow within a passenger compartment of a vehicle.

Door type valves are generally used to selectively direct air flow through the air pathways in the HVAC module. These valve are typically hinged at one end and pivot thereabout, in a similar as a common door. An example of such a valve is shown in U. S. Pat. No. 4,828,018 to Hoffman.

An alternative embodiment of such door type valves is shown in U.S. Pat. No. 4,402,486 to Jacquet. With such alternative embodiments, the valve is hinged along a central longitudinal axis. Accordingly, the valve pivots about the central axis. Such an embodiment is also shown at 30 in FIG. 1.

One of the problems associated with the aforementioned valve embodiments is the relatively large operating space required. More particularly, such valve embodiments require operating space sufficient enough to permit the valve to rotate in an arcuate path about its hinged axis.

Still another embodiment of valves for use in an HVAC module is a slide valve that is slidably disposed within a track for movement between positions for closing and opening air pathways. Such sliding valve systems produce excessive noise as a result of the valve rattling within the track and require excessive lateral operating space.

Accordingly, it is an object of this invention to provide a valve assembly for use in an HVAC module which is capable of operating in a reduced area both lengthwise and laterally of an HVAC module while avoiding excessive noise generation.

SUMMARY OF THE INVENTION AND ADVANTAGES

The present invention is directed toward an air flow control valve assembly for directing air flow through air chambers within an HVAC module. The valve assembly comprises; a valve for selectively directing air flow through the air chambers of the HVAC module; support means including a first end secured to the valve and defining a first axis, and further including a second end at a location spaced from the first end. The assembly further includes pivot means connecting the second end of the support means to the module and defining a second axis spaced from and parallel to the first axis for permitting the valve to swing in an arcuate path spaced from and about the second axis for maintaining the valve in various parallel positions so as to reduce the operating space of the valve both lengthwise and laterally of an HVAC module while controlling air flow through the air chambers for regulating the temperature of air flow into a passenger compartment.

BRIEF DESCRIPTION OF THE DRAWINGS

Other advantages of the subject invention will be readily appreciated as the same becomes better understood by reference to the following detailed description when considered in connection with the accompanying drawings wherein:

FIG. 2 is a perspective view partially cut away showing the preferred embodiment of the subject flat plane valve; and FIG. 3 is a side view of the preferred embodiment of the subject flat plane valve showing the valve in various positions.

DETAILED DESCRIPTION OF THE PREFERRED EMBODIMENT

Figure 1:
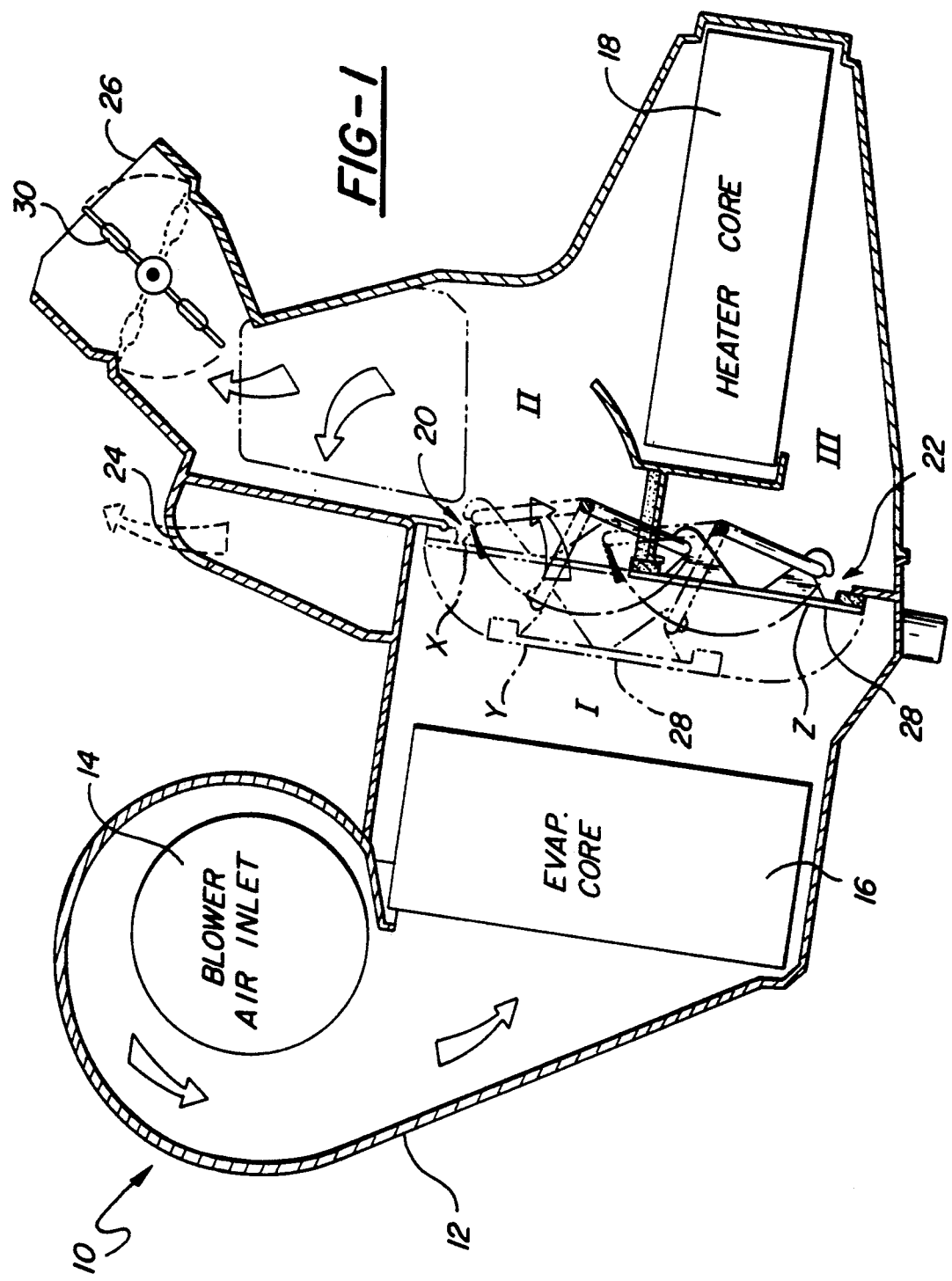
FIG. 1 is a side view in cross section of the HVAC module showing the subject flat plane valve in various positions.

A preferred embodiment of the invention will be now be described with reference to the accompanying drawings wherein like reference numerals are used throughout the various views to designate like or corresponding parts. Referring now to FIG. 1, a heating-ventilating-air conditioning (HVAC) module as typically used in vehicles to control passenger compartment air temperature is generally shown at 10. The HVAC module 10 includes a housing 12 comprising an air inlet (not shown), air blower 14, evaporator 16, heater core 18, air chambers I, II, and III, first and second ports 20, 22 and air outlets 24, 26. The module 10 is typically secured to the vehicle near the engine compartment (not shown). The evaporator 16 and heater core 18 are common heat exchangers and the air blower 14 and housing 12 are well known to those skilled in the art.

The housing 12 defines air flow pathways throughout the module 10, as shown by the large arrows in FIG. 1. More specifically, air is drawn into the module 10 by the air blower 14 and is subsequently directed through the evaporator 16, where heat may be drawn from the air in a manner commonly known in the art. Once through the evaporator 16, the air flow passes through air chamber I where it is selectively directed through the first port 20 to chamber II and through the second port 22 to chamber III. Air flow is selectively directed to the air chambers II and III by a flat plane valve 28, the operation of which will be described in detail subsequently. For the purposes of generally characterizing the space saving aspect of this invention, however, it should be noted that the flat plane valve 28 is selectively movable through a plurality of essentially parallel positions including a first position, X, (shown in phantom) wherein the valve 28 seals the first port 20 preventing air flow therethrough, a second position, Y, (shown in phantom) wherein the valve 28 permits air flow to both the first 20 and second 22 ports, and a third position, Z, wherein the flat plane valve 28 seals the second port 22 thus preventing air flow therethrough. Such parallel orientations serve to reduce both lengthwise and lateral space requirements of the valve 28 within the module 10.

Air flow entering the first port 20 travels through air chamber II whereas air flow entering the second port 22 travels through air chamber III, the heater core 18, and finally on to air chamber II. Accordingly, air flow passing through the second port 22 may absorb heat from the heater core 18 as it passes therethrough, whereas the air flow passing through the first port 20 bypasses the heater core and remains cool. Those skilled in the art will readily appreciate that the relative temperature of the air flow exiting the module 10 may be controlled by selectively positioning the valve 28 with respect to first and second ports 20,22, thereby controlling the portion of air flow passing through the heater core 18.

Once the air flow travels through air chambers II or III and II, the air flow passes on to the air outlet 24, which may, for example, extend to the dash area of an automobile (not shown). Additionally, air flow may travel to another air outlet 26, which may, for example, extend to a floorboard area of an automobile (not shown). A common valve 30 is shown positioned adjacent the air outlet 26 to selectively allow air flow through the air outlet 26. The common valve 30 may be actuated between an open position wherein air flow is allowed to flow therethrough or may be closed (as shown in phantom) to prevent air flow through the air outlet 26. The common valve 30 may be actuated by means commonly known in the art e.g. a push-pull cable system or the like. Thus, by controlling the positions of valves 28 and 30, the temperature and direction of air flow passing out of the HVAC module 10 may be controlled.

Referring now to FIG. 2, the subject flat plane valve, generally indicated at 28, will now be described in detail. The valve 28 is shown having a rectangular shape generally corresponding to the shape of the first 20 and second 22 ports and having an area generally congruent to the area of each of the ports 20,22. It will be appreciated by those skilled in the art that the external shape of the valve and ports need not be of the same shape nor be rectangular e.g. they may be elliptical or maintain other shapes. The valve 28 includes a single sealing surface 32 which is engageable with both the first 20 and second 22 ports to perfect a seal therewith. The single sealing surface 32 includes a gasket member 34 disposed about its outer periphery which contacts the outer periphery of the ports 20, 22. The gasket member 34 is preferably comprised of a compressible material, such as water resistant molded rubber or foam material, which compresses to perfect a seal with the ports 20,22 when engaged with the outer peripheries 20a,22a thereof, as shown in FIG. 3.

Support means is provided for supporting the flat plane valve 28. The support means comprises at least one and preferably two support arms 36,36'. The support arms 36,36' include first ends 38,38' secured to the sealing side surface 32 of the valve 28 and second ends 40,40' rotatably secured to a portion of the housing 12 so that the valve 28 may move through an arcuate path in order to engage the first 20 and second 22 ports. In the preferred embodiment, as shown in FIG. 2, the support means includes upper 36 and lower 36' support arms. The upper 36 and lower 36' support arms are preferably identical; accordingly only the upper support arm 36 will be described in detail, however, it will be appreciated that the subsequent discussion applies to the lower support arm 36' as well. For reference purposes, corresponding parts of the lower support arm 36' have been designated with primed numerals in the Figures.

In the preferred embodiment, the support arm 36 is substantially U-shaped so that the first end 38 thereof defines a first axis, as shown with respect to the upper support arm 36 by axis, A. The first end 38 of the support arm 36 is preferably rotatably secured to the valve 28 in any manner commonly known in the art. For example, as shown in FIG. 2, attachments 42 are secured to the sealing side surface 32 of the valve 28 and receiving the first end 38 of the support arm 36. The first end 38 of the support arm 36 is preferably locked into hook portions 44 of the attachments 42 and may rotate therein while being locked. Lock members 46 may be disposed along the first end 38 of the support arms 36 and adjacent the attachments 42 for preventing relative sliding between the support arm 36 and the attachments 42. The lock members 46 may include foam or rubber washer members tightly fit about the support arm 36 or may include other known means such as clips or pins (not shown). Accordingly, although the first end 38 of the support arm 36 is secured to the valve 28, the valve 28 may rotate about the first axis A due to the rotational fit between the first end 38 and the attachments 42. Although preferred, the first end 38 of the support arm 36 need not be rotatably secured to the valve 28. More particularly, the first end 38 may be rigidly secured to the valve; however, in such a case, the first 20 and second 22 ports must be orientated along planes which are parallel to that of the valve, as the valve engages each port to assure that the valve will seal along the entire periphery of port. In the case of the preferred embodiment, the freedom of movement on the first axis A will allow the flat plane valve 28 to angularly adjust into a sealed seated relationship with ports that are out of parallel therewith.

The second end 40 of the support arm 36 is rotatably secured to the housing 12 for supporting the valve 28 at a location spaced from the first end 38 of the support arm 36. Pivot means 50 are provided for rotatably securing the second end 40 of the support arm 36 to the housing 12 thus permitting the support arm 36 and valve 28 to rotate in an arcuate path about a second axis B into its various parallel space saving orientations. More specifically, the second end 40 includes two end stops 52 which engage apertures 54 disposed in the housing 12. The pivot means 50 comprises the apertures 54 in the housing 12 which receive the end stops 52 and defines the second axis B which is spaced from and parallel to the first axis A. It is this second axis B which the valve 28 rotates about. It will be appreciated that many pivot means may be employed and are common in the art and that the particular pivot means disclosed is only one possible means for providing a rotatable attachment between the housing 12 and the second end 40 of the support arm 36. Lock members 46 may be disposed adjacent the end stops 52 to assist in maintaining the end stops 52 within the apertures 54. Thus, due to the pivot attachment between the second end 40 of the support arm 36 and the housing 12, the valve 28 and the support arm 36 are permitted to rotate through a plurality of positions along an arcuate path spaced from and about the second axis B, (best shown in FIG. 3) including a first position X (shown in phantom in FIG. 3) wherein said sealing surface 32 of the valve 28 seals the first port 20, a second position Y (parallel to position X) wherein the valve 28 permits air flow to both the first 20 and second 22 ports, and a third position Z (parallel both positions X and Y) (shown in phantom in FIG. 3) wherein the seal surface 32 of said valve 28 seals the second port 22.

An actuator member 56 is secured to one of the support arms 36,36' as shown in FIG. 2 and controls the valve 28 position by rotating the valve 28 through the arcuate path about the second axis B. The actuator member 56 comprises a control means (not shown), well known in the art. For example, the control means may include an electric motor for rotating the support arm 36 about the second axis B. Alternatively, a push-pull cable system (not shown) may be used wherein a cable may be actuated by pulling a control cable. Alternatively, the control means may include a pneumatic, hydraulic, or electronic system as is also well known in the art. In other systems, the control means may be automated to respond to the temperature in the occupant area of the vehicle (not shown), as is common in the art.

The housing 12 includes a divider wall 58 which separates air chambers II and III. The divider wall 58 includes slots 60 therein (best shown in FIG. 2) for receiving the support arm 36 therethrough as the valve 28 is rotated about the arcuate path. More specifically, due to the recessed attachment location of the second end 40 of the support arm 36 with the housing 12, the support arm 36 must pass through the divider wall 58 in order to permit the valve 28 to rotate through the actuate path, about the second axis B. For example, in FIG. 3, as the valve 28 is rotated from the first position X to the third position Z, the support arm 36 must pass through the divider wall 58, as shown. If the valve assembly includes upper 36 and lower 36' support arms, as shown, the lower support 36' must also pass through the divider wall 58 as the valve 28 is rotated from the third position Z to the first position X. Accordingly, slots 60 are provided in the divider wall 58 (best shown in FIG. 2) to receive the support arms 36,36'. In order to prevent air flow from passing through the slots 60, a seal 62 is secured to the divider wall 58. The seal 62 preferably comprises a resilient, yieldable material such as urethane foam and may be secured to the divider wall 58 with a pressure sensitive adhesive. The seal 62 includes slits 64 therein corresponding in location with the slots 60 for permitting the support arms 36,36' to move through the slots 60 while simultaneously conforming the seal 62 in sealing engagement to the circumference of the support arms 36,36' for preventing air flow therethrough.

The invention has been described in an illustrative manner and it is to be understood that the terminology which has been used is intended to be in the nature of words of description rather that of limitation. For example, it should be appreciated by those skilled in the art that the particular HVAC module embodiment disclosed in FIG. 1 is intended to be generic in nature and those skilled in the art will appreciate that the subject invention may be adapted for modules wherein the relative positions of the various component i.e. evaporator, heater core, etc, varies from that specifically disclosed or may have additional or fewer components included therein. Additionally, it is noted that the HVAC module may operate as a heat pump wherein the function of the heat exchangers (the evaporator and heater core) may functionally operate differently depending upon whether the system is heating or cooling.

Furthermore, although the subject flat plane valve has been described in an environment whereby the valve directs air flow either through or around a heater core, it will be appreciated that the subject valve may be positioned in other locations within the module to direct air flow between multiple paths e.g. air flow between a dash board air vent and a floor board air vent.

The embodiments of the invention in which an exclusive property or privilege is claimed are defined as follows:

1. An air flow control valve assembly for directing air flow through air chambers within a HVAC module housing, said valve assembly comprising:
    a valve for selectively directing air flow through the air chambers of the HVAC housing;
    support means including a first end secured to said valve and defining a first axis, and a second end to be secured to the housing for supporting said valve at a location spaced from said first end; and
    pivot means located adjacent said second end of said support means and defining a second axis spaced from and parallel to said first axis for permitting said valve to move along an arcuate path spaced from and about said second axis into spaced, parallel control positions to control air flow through the air chambers.

2. An air flow control valve assembly for directing air flow into ports of air chambers located within a HVAC module housing, said valve assembly comprising:
    a flat plane valve for selectively directing air flow through the air chambers of the HVAC housing, said valve including a single sealing surface for sealing the ports of the air chambers;
    at least one support arm including a first end secured to said valve and defining a first axis and a second end to be secured to the housing for supporting said valve at a location spaced from said first end;
    and a pivot attachment located adjacent said second end of said support arm and defining a second axis spaced from and parallel to said first axis for permitting said valve to move along an arcuate path spaced from and about said second axis into spaced, parallel control positions to control air flow into the ports of the air chambers.

3. An air flow control valve assembly for directing air flow through a HVAC module, said assembly comprising:
    a housing including a plurality of air chambers;
    first and second port interconnecting said air chambers;
    a flat plane valve for controlling air flow into said ports, said valve including a single sealing surface for sealing both said first and second ports;
    at least one support arm including a first end rotatably secured to said valve and defining a first axis for permitting said valve to pivot thereabout and a second end secured to the housing for supporting said valve at a location spaced from said first end; and
    a pivot attachment secured between said second end of said support arm and said housing and defining second axis spaced from and parallel to said first axis for permitting said valve to rotate through a plurality of positions along an arcuate path spaced from and about said second axis, including a first position wherein said sealing surface of said valve seals said first port, a second position wherein said valve permits air flow to both said first and second ports, and a third position wherein said seal surface of said valve seals said second port, said first, second and third positions of said valve being substantially parallel to one another.

4. An air flow control valve assembly for directing air flow through a HVAC module, said assembly comprising:
- a housing including a plurality of air chambers;
- a first and second port interconnecting said air chambers;
- a flat plane valve for controlling air flow into said ports, said valve including a single sealing surface for sealing both said first and second ports;
- at least one support arm including a first end rotatably secured to said valve and defining a first axis for permitting said valve to pivot thereabout and a second end secured to the housing for supporting said valve at a location spaced from said first end;
- a pivot attachment secured between said second end of said support arm and said housing and defining second axis spaced from and parallel to said first axis for permitting said valve to rotate through a plurality of positions along an arcuate path spaced from and about said second axis, including a first position wherein said sealing surface of said valve seals said first port, a second position wherein said valve permits air flow to both said first and second ports, and a third position wherein said seal surface of said valve seals said second port, said first, second and third positions of said valve being substantially parallel to one another;
- an actuator member secured to said support arm for rotating said valve about said arcuate path;
- said housing including a divider wall separating two of said air chambers;
- said divider wall including at least one slot therein for receiving said support arm as said valve is rotated about said arcuate path;
- a seal secured to said housing for preventing air flow through said slot; and
- said seal including a slit therein corresponding with said slot for permitting said support arm to move therethrough while preventing air flow therethrough.

* * * * *